(12) United States Patent
Conrod

(10) Patent No.: US 9,505,361 B2
(45) Date of Patent: Nov. 29, 2016

(54) VEHICLE BUMPER

(71) Applicant: Multimatic Inc., Markham (CA)

(72) Inventor: Bryan Jeffrey Conrod, Markham (CA)

(73) Assignee: Multimatic Inc., Markham (CA)

( * ) Notice: Subject to any disclaimer, the term of this patent is extended or adjusted under 35 U.S.C. 154(b) by 0 days.

(21) Appl. No.: 14/046,616

(22) Filed: Oct. 4, 2013

(65) Prior Publication Data

US 2015/0097384 A1 Apr. 9, 2015

(51) Int. Cl.
*B60R 19/02* (2006.01)
*B60R 19/18* (2006.01)
*B21B 15/00* (2006.01)

(52) U.S. Cl.
CPC ........... *B60R 19/18* (2013.01); *B21B 15/0007* (2013.01); *B60R 2019/1813* (2013.01); *B60R 2019/1866* (2013.01)

(58) Field of Classification Search
CPC ............... B29C 47/0033; B65D 2571/00141; B65D 2571/0066; B65D 5/003; B65D 5/3642; B60R 19/18; B60R 19/24; A63H 17/395; A63H 13/005; A63H 17/262
USPC .......... 293/102, 120, 121, 122, 155
See application file for complete search history.

(56) References Cited

U.S. PATENT DOCUMENTS

| | | | | |
|---|---|---|---|---|
| 3,827,740 A | * | 8/1974 | Golze et al. | 293/120 |
| 3,837,695 A | * | 9/1974 | Haase et al. | 293/110 |
| 3,938,840 A | * | 2/1976 | Haase et al. | 293/110 |
| 4,397,490 A | * | 8/1983 | Evans et al. | 293/120 |
| 5,078,439 A | | 1/1992 | Terada et al. | |
| 5,306,058 A | | 4/1994 | Sturrus et al. | |
| 5,395,036 A | * | 3/1995 | Sturrus | 228/146 |
| 5,829,666 A | * | 11/1998 | Takeda et al. | 228/147 |
| 5,934,544 A | * | 8/1999 | Lee et al. | 228/146 |
| 6,141,935 A | | 11/2000 | Artner et al. | |
| 6,217,089 B1 | * | 4/2001 | Goto et al. | 293/102 |
| 6,360,441 B1 | | 3/2002 | Himsl et al. | |
| 6,481,690 B2 | | 11/2002 | Kariatsumari et al. | |
| 6,726,258 B1 | * | 4/2004 | Sundgren et al. | 293/102 |
| 6,726,259 B2 | | 4/2004 | Kettler et al. | |
| 6,726,261 B2 | | 4/2004 | Goto et al. | |
| 6,814,380 B2 | | 11/2004 | Yoshida et al. | |
| 6,923,482 B2 | | 8/2005 | Cumming et al. | |
| 6,986,536 B1 | * | 1/2006 | Heatherington et al. | 293/102 |
| 7,007,989 B2 | * | 3/2006 | Yoon | 293/120 |
| 7,025,396 B2 | * | 4/2006 | Omura et al. | 293/102 |

(Continued)

FOREIGN PATENT DOCUMENTS

WO 2005110638 A1 11/2005

OTHER PUBLICATIONS

Gruber, Robert; International Search Report issued in corresponding PCT Application No. PCT/CA2014/050912; search completed Dec. 31, 2014.

*Primary Examiner* — Kiran B Patel
(74) *Attorney, Agent, or Firm* — Blake, Cassels & Graydon LLP; John R. S. Orange

(57) ABSTRACT

A beam for a vehicle bumper is formed from a continuous web of material as a closed tubular body. The body has top and bottom walls connected by inner and outer walls. A support extends between the inner and outer walls and a reinforcement overlies at least a portion of the outer wall between the support and the bottom wall to provide a double walled structure.

10 Claims, 11 Drawing Sheets

(56) References Cited

U.S. PATENT DOCUMENTS

| | | |
|---|---|---|
| 7,066,508 B1 | 6/2006 | Baccouche et al. |
| 7,108,303 B2 | 9/2006 | Bladow et al. |
| 7,197,824 B1 * | 4/2007 | Graber ................... 29/897.2 |
| 7,222,896 B2 | 5/2007 | Evans |
| 7,338,099 B2 | 3/2008 | Okabe et al. |
| 7,494,165 B2 | 2/2009 | Evans et al. |
| 7,503,601 B2 | 3/2009 | Agrahari |
| RE40,736 E * | 6/2009 | Heatherington et al. ..... 293/102 |
| 7,926,868 B2 * | 4/2011 | Braunbeck et al. ..... 296/187.03 |
| 7,963,019 B2 * | 6/2011 | Reed et al. ................ 29/525.14 |
| 8,016,331 B2 * | 9/2011 | Ralston et al. .............. 293/120 |
| 8,308,207 B2 * | 11/2012 | Fang et al. ................. 293/132 |
| 8,408,632 B2 * | 4/2013 | Shimotsu et al. ............ 296/102 |
| 8,746,761 B2 * | 6/2014 | Haneda et al. ............... 293/102 |
| 2002/0149214 A1 * | 10/2002 | Evans ........................ 293/120 |
| 2004/0154158 A1 * | 8/2004 | Sundgren et al. ............. 29/564 |
| 2005/0057053 A1 * | 3/2005 | Evans et al. ................. 293/133 |
| 2005/0162631 A1 * | 7/2005 | Graber .......................... 355/67 |
| 2006/0061111 A1 | 3/2006 | Ignafol |
| 2008/0028720 A1 * | 2/2008 | Bartlett et al. ............... 52/726.2 |
| 2008/0093867 A1 | 4/2008 | Glasgow et al. |
| 2008/0217934 A1 * | 9/2008 | Hori et al. ................... 293/102 |
| 2008/0284183 A1 | 11/2008 | Johnson |
| 2008/0284184 A1 | 11/2008 | Norton et al. |
| 2009/0064502 A1 * | 3/2009 | Mellis ......................... 29/897.2 |
| 2012/0074720 A1 * | 3/2012 | Johnson et al. ............. 293/102 |

* cited by examiner

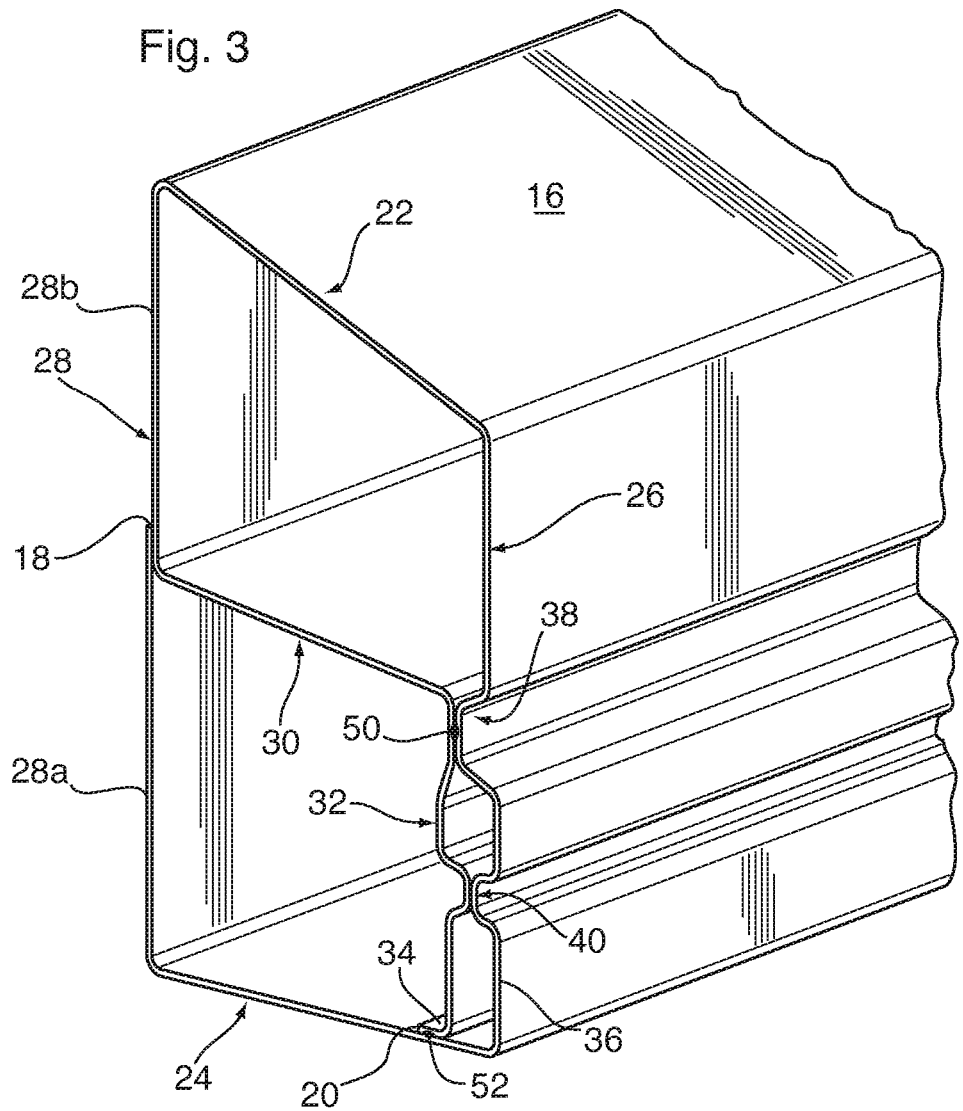

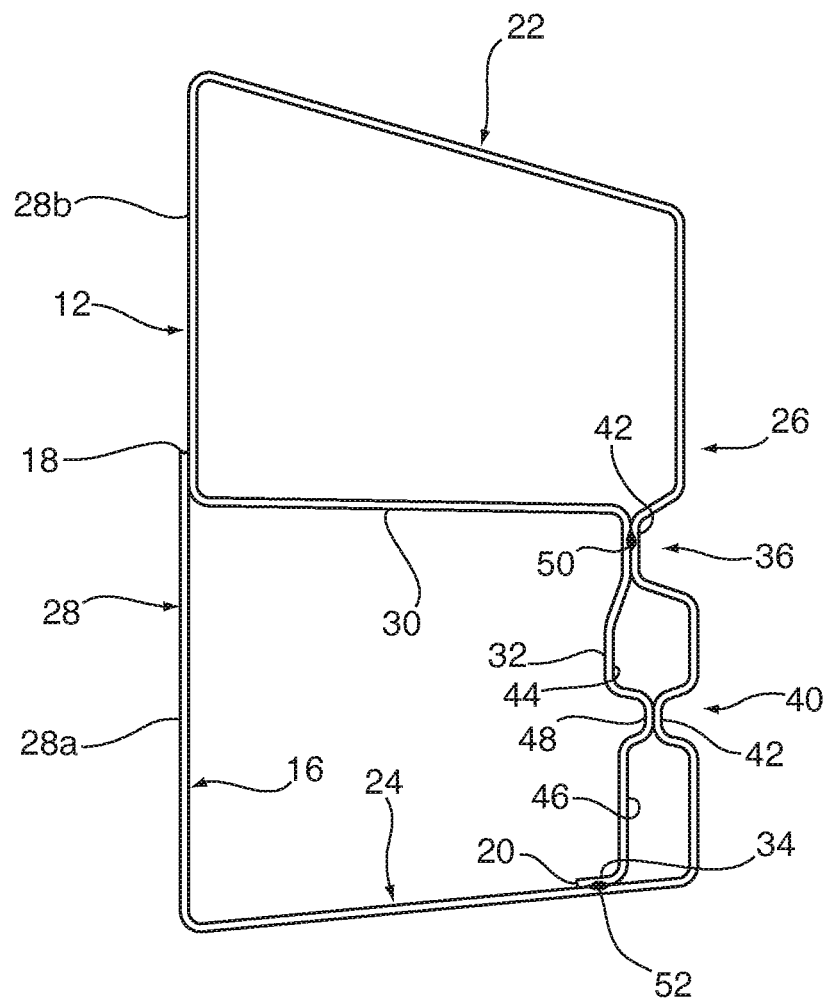

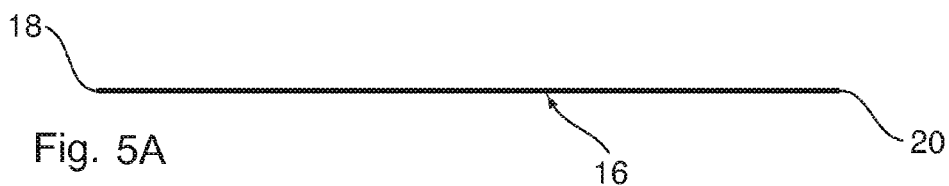
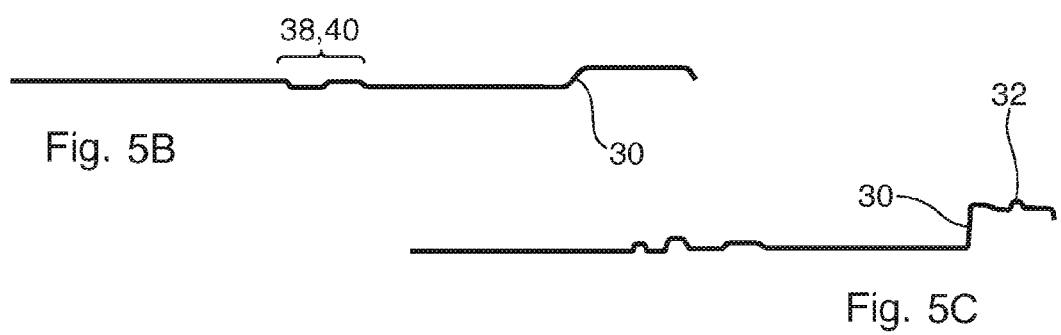
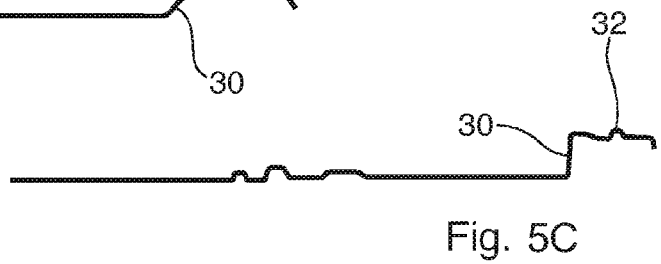
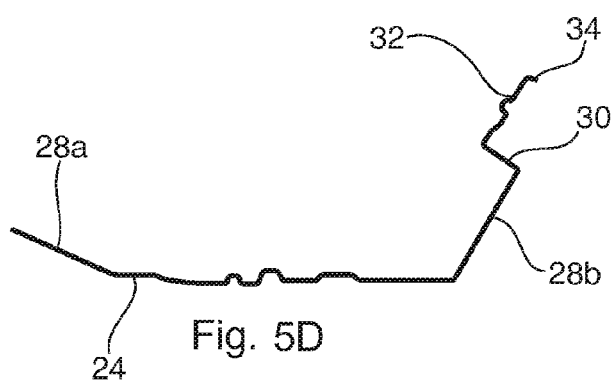
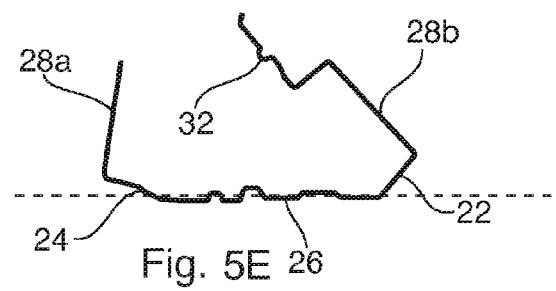
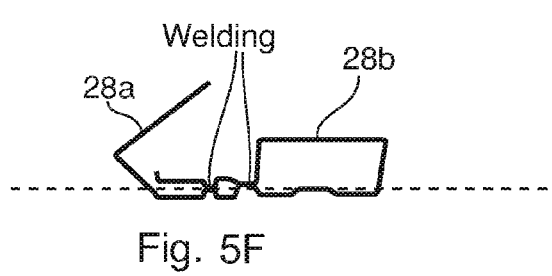
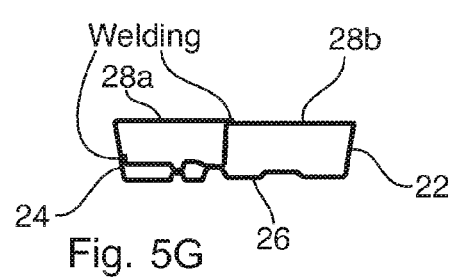

VEHICLE BUMPER

FIELD OF THE INVENTION

The present invention relates to beams for use as a vehicle bumper.

DESCRIPTION OF PRIOR ART

Bumpers are used on vehicles to protect the front and rear of the vehicles from the effect of minor impacts and to transfer loads into the vehicle structure during major impacts. The bumpers project from the vehicle and provide the initial point of contact of the vehicle with other structures.

Bumpers have evolved from a simple beam secured to the chassis of a vehicle into an integral part of a sophisticated impact absorption system. The impact absorption system transfers loads into energy absorbing structures of the vehicle, which function to mitigate the effect of an impact on the occupants of the vehicle as well as minimizing the damage during low speed impacts as can occur during vehicle parking manoeuvres and there like. Specific test criteria have been mandated which the bumpers implemented on modern vehicles must meet. At the same time, commercial realities require the cost of construction and the weight of the bumper to be minimized.

U.S. Pat. No. 6,217,089 to Goto shows a bumper that is roll formed into a tubular structure with a central web running from the front to the rear of the structure. Similar structures are shown in U.S. application 2008/0284184 and U.S. application 2008/0093867, which have a pair of webs extending from the vehicle toward the outwardly directed face of the bumper beam.

Whilst these arrangements allow for economical manufacturing from a single blank, it is found that they are not able to withstand the impacts imposed by the applicable standards without substantially increasing the thickness of the material used in their construction. Such an increase in thickness not only increases the cost but also the weight of the structure.

U.S. Pat. No. 6,726,261 to Goto shows a localized reinforcement in which an additional component is secured to the tubular beam to project forward of the beam in the central region of the vehicle. Such a construction requires additional processing steps in the manufacture and therefore adds to the inherent cost of such a structure.

OBJECT OF THE INVENTION

It is therefore an object of the present invention to provide a beam for a vehicle bumper in which the above disadvantages are obviated or mitigated.

SUMMARY OF THE INVENTION

According to the present invention there is provided a beam for a vehicle bumper. The beam comprises an elongate, closed tubular body formed from a continuous web of metal. The body has a first pair of walls spaced from one another and a second pair of walls spaced from one another and extending between the first pair of walls. A support extends between the second pair of walls intermediate first pair of walls and a reinforcement extends between the support and one of the first pair of walls. The reinforcement is located adjacent to but spaced from one of the second pair of walls. A double walled structure is thereby provided over at least a portion of said one of said second pair of walls.

BRIEF DESCRIPTION OF THE DRAWINGS

Embodiments of the invention will now be described by way of an example only with reference to the accompanying drawings in which:

FIG. 3 is an enlarged perspective view of the beam of FIG. 2.

FIG. 4 is an end view of the beam shown in FIG. 3.

FIG. 5(A) is an end view showing the starting condition for forming a bumper beam.

FIG. 5(B) is a view similar to FIG. 5a showing a subsequent step in the forming process.

FIG. 5(C) is a view similar to FIG. 5b showing a subsequent step in the forming process.

FIG. 5(D) is a view similar to FIG. 5c showing a subsequent step in the forming process.

FIG. 5(E) is a view similar to FIG. 5d showing a subsequent step in the forming process.

FIG. 5(F) is a view similar to FIG. 5e showing a subsequent step in the forming process.

FIG. 5(G) is a view similar to FIG. 5f showing a subsequent step in the forming process.

DETAILED DESCRIPTION OF THE INVENTION

Figure 1:
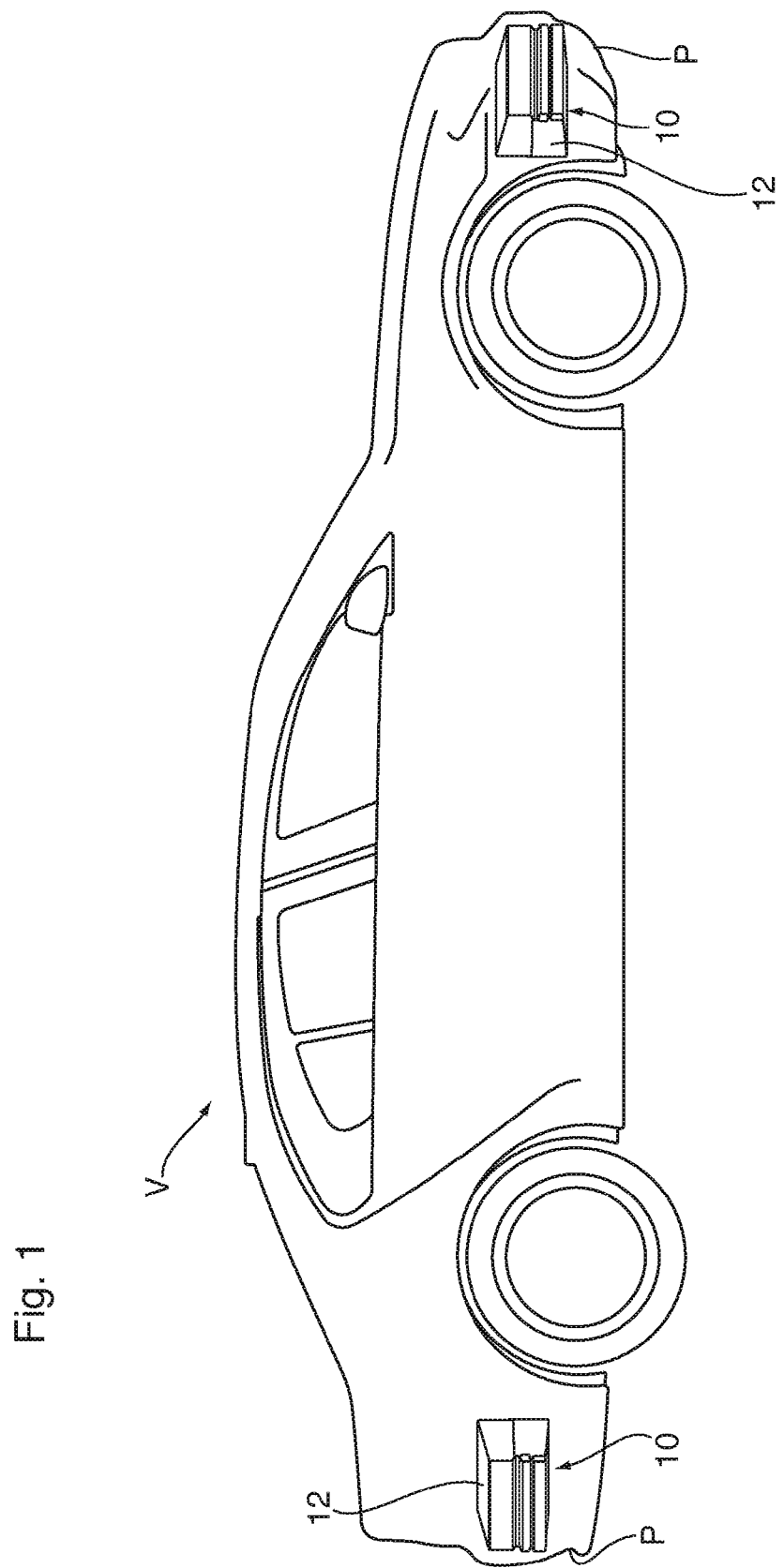
FIG. 1 is a side view of a vehicle showing a bumper beam at the front and rear.
Figure 2:
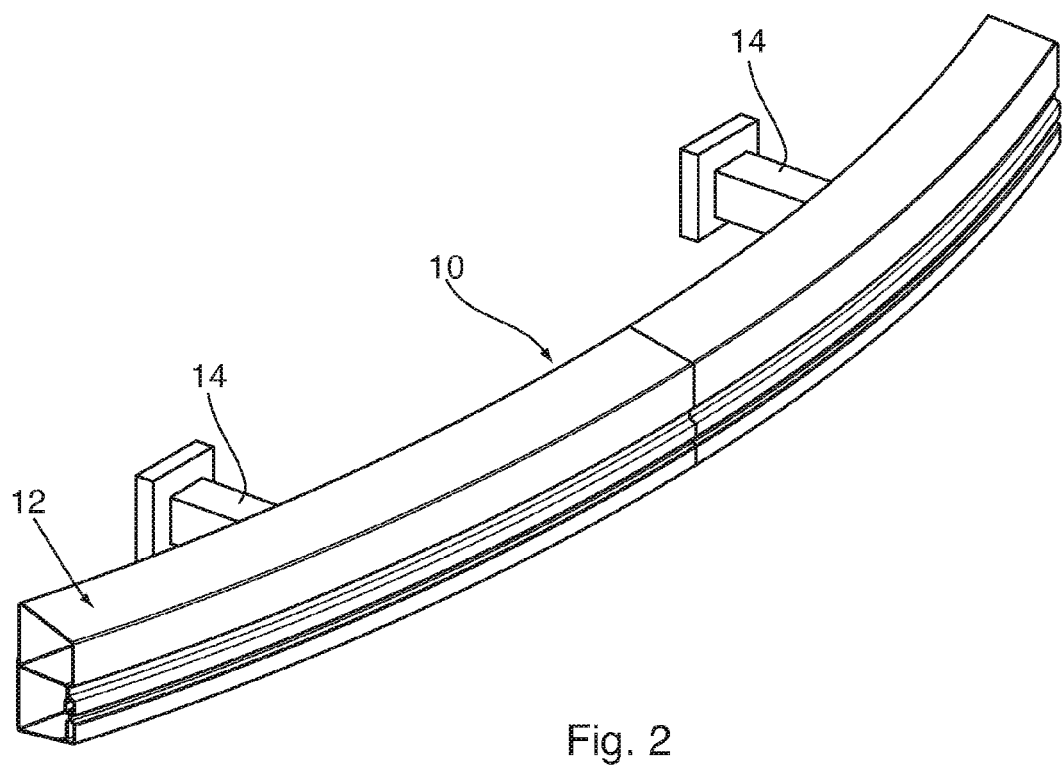
FIG. 2 is a perspective view of a bumper beam used on the vehicle in FIG. 1.
Figure 6A:
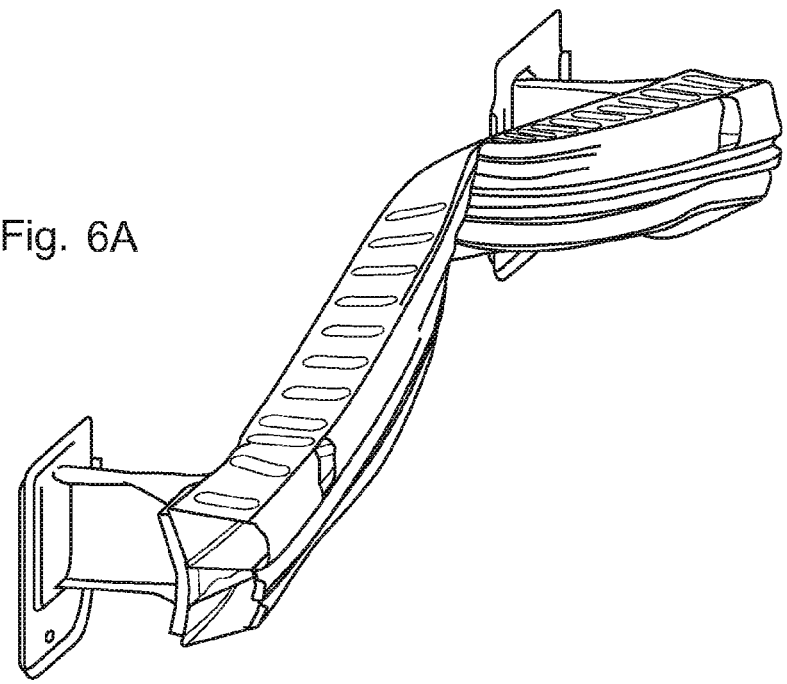
FIGS. 6(A) and 6(B) is a pictorial representation of the results of a standardized test performed on a prior art beam.
Figure 6B:
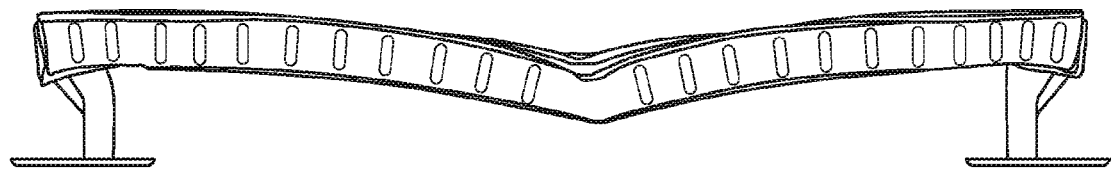
Figure 7A:
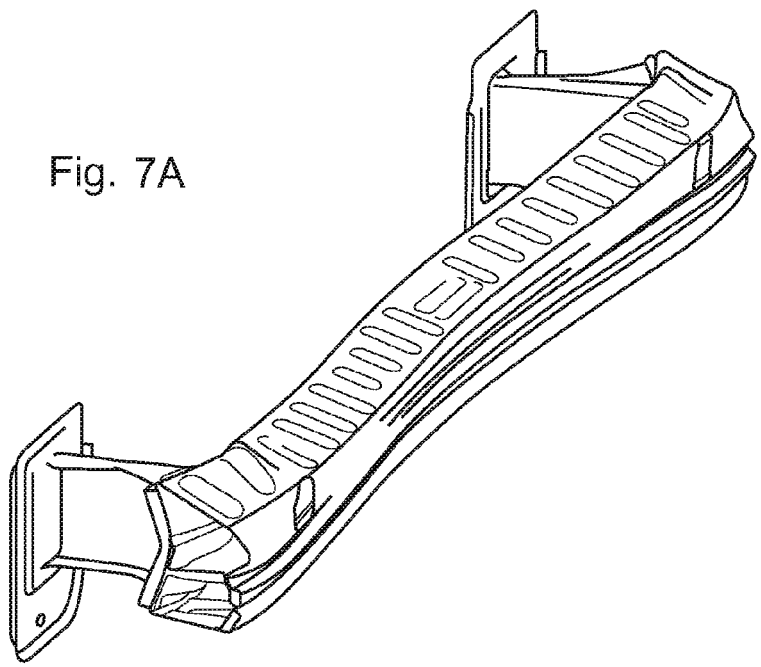
FIGS. 7(A) and 7(B) is a pictorial representation of the beam of FIGS. 2 to 4, subjected to the same test as that in FIGS. 6(A) and 6(B).
Figure 7B:
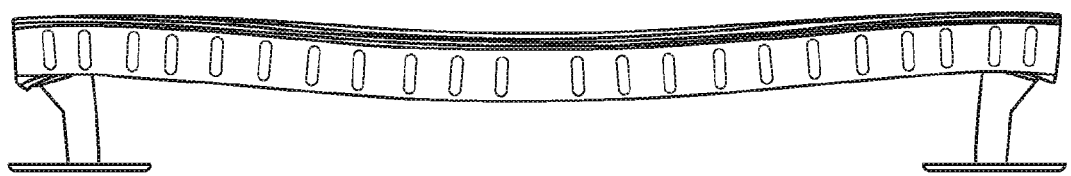

Referring therefore to FIG. 1, a vehicle V has a bumper assembly 10 integrated into the front and rear structures of the vehicle V. The bumper assembly 10 includes a bumper beam 12 that extends laterally across the vehicle V and is secured to the load supporting structure of the vehicle through pedestals 14, as shown in FIG. 2. The bumper beam 12 is typically integrated into the outer envelope of the vehicle V by covering panels P. It will also be noted from FIG. 2 that the beam 12 is curved along its longitudinal axis so as to conform to the required envelope of the vehicle V.

The structure of the beam 12 can best be seen in FIGS. 3 and 4. The beam 12 is formed from a single web 16 of metal having lateral free edges 18, 20. As will be explained more fully below with respect to FIG. 5, the web 16 is rolled into the form of the beam 12 by passing through a series of roll forming stations that progressively form the required structure of the beam. The beam so produced is of indeterminate length that can be cut to the desired length and formed to the finished curvature using conventional post forming techniques.

The beam 12 has a first pair of walls, namely a top wall 22 and a bottom wall 24 spaced apart on a vertical axis. It will be appreciated that the reference to top, bottom, inner and outer, as used herein, refer to the orientation of the beam when installed on the vehicle V. The top wall 22 and bottom wall 24 are interconnected by a second pair of walls, namely an outer wall 26 and inner wall 28. A support 30 extends from the outer wall 26 to the inner wall 28 approximately midway between the top and bottom walls 22 and 24. A reinforcement 32 extends from the support 30 adjacent to its intersection with the outer wall 26 to the bottom wall 24. The distal end of the reinforcement is folded laterally to provide a flange 34 that overlies the bottom wall 24.

As can be seen in FIGS. 3 and 4, the top wall 22, bottom wall 24, outer wall 26, inner wall 28, support 30 and reinforcement 32 are all folded from the web 16 and are connected to one another at their junctures by radiussed fold lines. A lower portion 28a of inner wall 28 is formed by a marginal portion of the web 16 extending from free edge 18. An upper portion 28b of the inner wall 28 is defined by an intermediate portion of the web 16 and the free edge 18 is welded to the upper portion 28b adjacent to the support 30 to provide an integral inner wall 28.

A lower portion 36 of outer wall 26 is corrugated to provide a pair of troughs 38, 40. Each of the troughs has a base 42 (FIG. 4) that extends parallel to the plane of the outer wall 26.

The reinforcement 32 is similarly corrugated to provide a channel 44 and a offset 46 separated from the channel 44 by a land 48. The offset 46 terminates in the flange 34 that overlies the bottom wall 24.

The reinforcement 32 is secured to the outer wall 26 by a weld 50 on the base of the trough 38, adjacent to the intersection of the support 30 with the reinforcement 32. The flange 34 is similarly welded, as indicated at 52, to the bottom wall 24 to provide a unitary structure for the beam 12. If required, a weld may also be provided at the abutment of the reinforcement with the trough 40, although in most situations this will not be required.

The welds 50, 52 may be provided as periodic welds such as spot or plug welding or as a continuous seam weld as by laser welding or similar techniques or other bonding techniques may be used to provide an integral structure.

The web 16 is thus formed into a closed tubular beam and the reinforcement 32 provides a double wall structure along the entire length of the outer wall 26, which enables it to withstand point impacts applied at the center of the beam 12 as required by the applicable vehicle standards.

The essentially planar web 16 may be formed into the configuration of beams shown in FIGS. 3 and 4 through a suitable technique operating on either a discrete blank or on a continuous strip of material. The techniques available include sequential folding operations using a brake press, or a continuous roll forming operation using a series of rolling stations illustrated in FIG. 5. It will be appreciated that the stations shown in FIG. 5 represent the major steps in the formation and the transition between stations may in fact be performed by passage through several intermediary rolling stations.

Initially, the planar web 16 with free edges 18 and 20 is introduced into the initial rolling stations from a roll or similar stock of sheet material. During the initial deformation of the web 16, shown in step (b), the portion of the web 16 adjacent the free edge 20 is displaced from the plane of the web 16 to initialize formation of the reinforcement 32 and formation of the troughs 38, 40 is initiated at the middle portion of the web 16.

Further passes produce the support 30 projecting at right angles from the plane of the web 16 with the reinforcement 34 formed with the corrugations and the flange 34, as shown at 5(c).

At the station represented at 5(d), the corrugations defining troughs 38, 40, channel 44 and offset 46 have developed to their full depth in the central portion of the web and on the reinforcement 32.

The folding stations then fold the web, as shown in steps (e) and (f), to define the fold line between the top wall 22 and the inner wall 28. Similarly the web is folded at the opposite free edge to define the fold line between the bottom wall 24 and the inner wall 28.

The folding continues until the reinforcement 32 abuts the lower portion 36 of the outer wall 26. This is shown at step (f). Welds 50, 52 are placed at the base of the troughs 38, 40 to connect the lower portion 36 to the reinforcement 32. Upon completion of the welds, the bottom wall 24 is folded to bring it into contact with the flange 34 and the lower portion 28(a) of the inner wall 28 in contact with the upper portion 28(b). Welds then performed to connect the flange 34 to the bottom wall 24 and the two portions of the inner wall 28.

The steps illustrated in FIG. 5 are performed on a continuous basis to permit beams of indeterminate lengths to be manufactured, which may then be cut to the desired length. Where a folding operation on a blank is used, the beam will be of the required length, although trimming may be required.

The beam 12 may be shaped to conform to the overall configuration required for the vehicle using conventional post forming techniques, and then secured to the pedestals 14.

The provision of the reinforcement 32 provides a significant increase in the performance of the beam 12 in test situations and permits the beam to be formed from thinner and therefore lighter material. In a typical application, as used on an intermediate sized vehicle, the thickness of the web 16 was in the order of 1.0-1.5 millimeters using a 1200-1500 Mega Pascal grade of steel.

Figure 8:
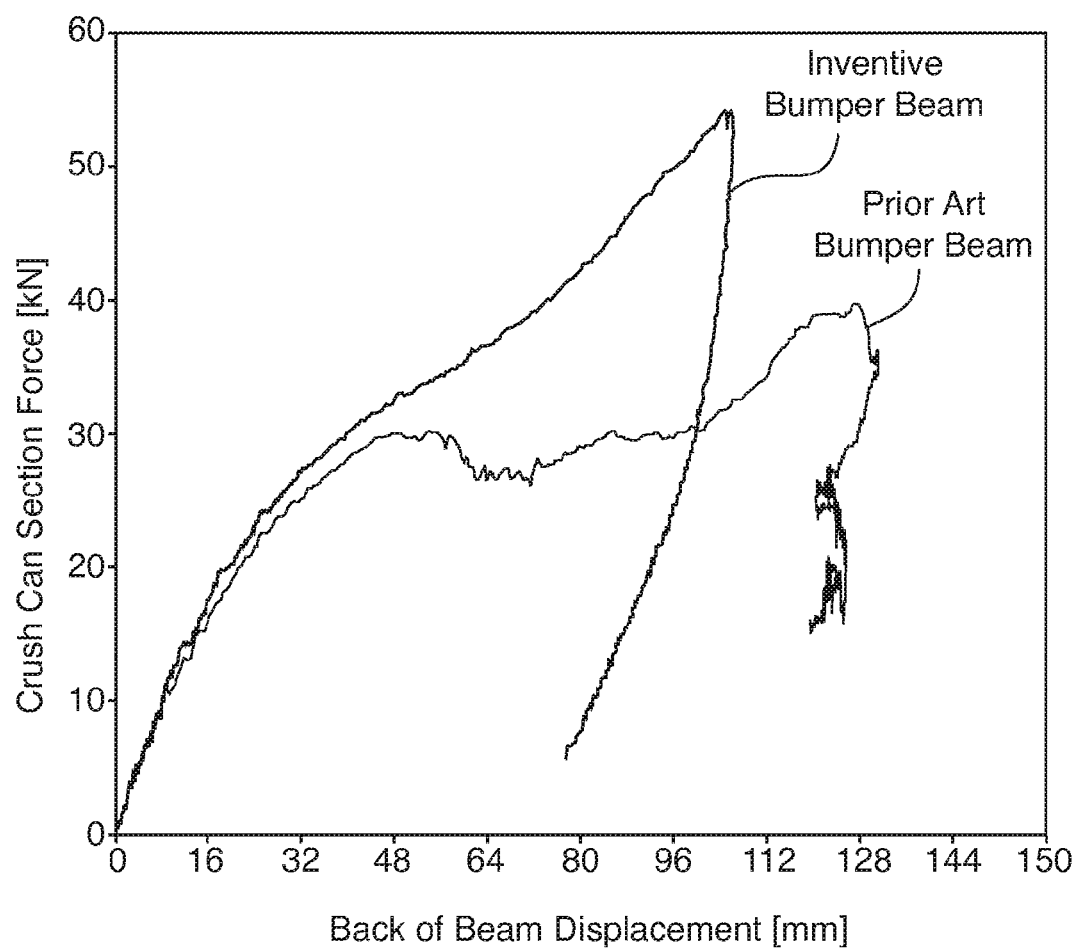
FIG. 8 is a graphical representation showing the load defection curve for the beams of FIGS. 6(A) and 6(B) and 7(A) and 7(B).

The enhanced performance of the beam 12 can be assessed from the consideration of FIGS. 6(A) and 6(B) and 7(A) and 7(B). These depict the results of a bumper beam subjected to a standard barrier test in which the beam is subjected to a centralized point impact at the midpoint of the beam. As can be seen in FIG. 6, which shows a prior art bumper formed without a reinforcement, the impact causes folding of the beam at its midpoint and significant vertical displacement of the central portion of the beam. By contrast, the beam shown in FIGS. 7(A) and 7(B), that utilizes a reinforcement as shown above, under the same test conditions, shows a smaller permanent deformation without folding, and insignificant vertical displacement of the beam. The comparison between the results of FIGS. 6(A) and 6(B) and 7(A) and 7(B) is shown graphically in FIG. 8, where it will be seen that the prior art shown in FIGS. 6(A) and 6(B) exhibits an elastic limit in the order of 30 kilo Newtons and a significant displacement of the beam at that load. By contrast, the beam shown in FIGS. 7(A) and 7(B) exhibits a continuing substantial elastic deformation beyond 30 kilo Newtons and a significant recovery upon removal of the load.

The provision of the reinforcement 32 adjacent the outer wall therefore is seen to improve the physical characteristics of the bumper beam 12 whilst at the same time allowing economic manufacture from a single web.

Figure 9:
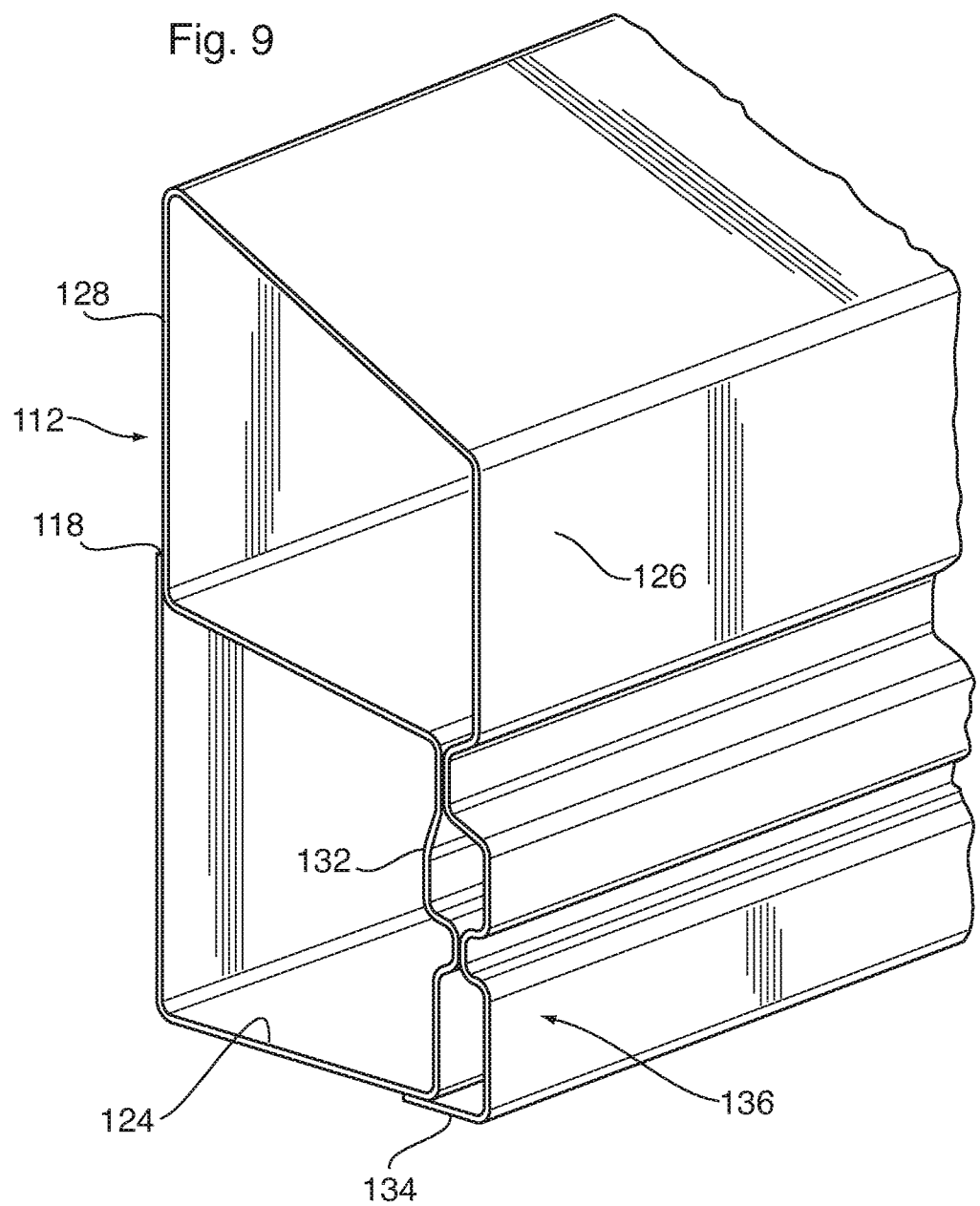
FIG. 9 is a view similar to FIG. 3 of an alternative embodiment of beam.
Figure 10:
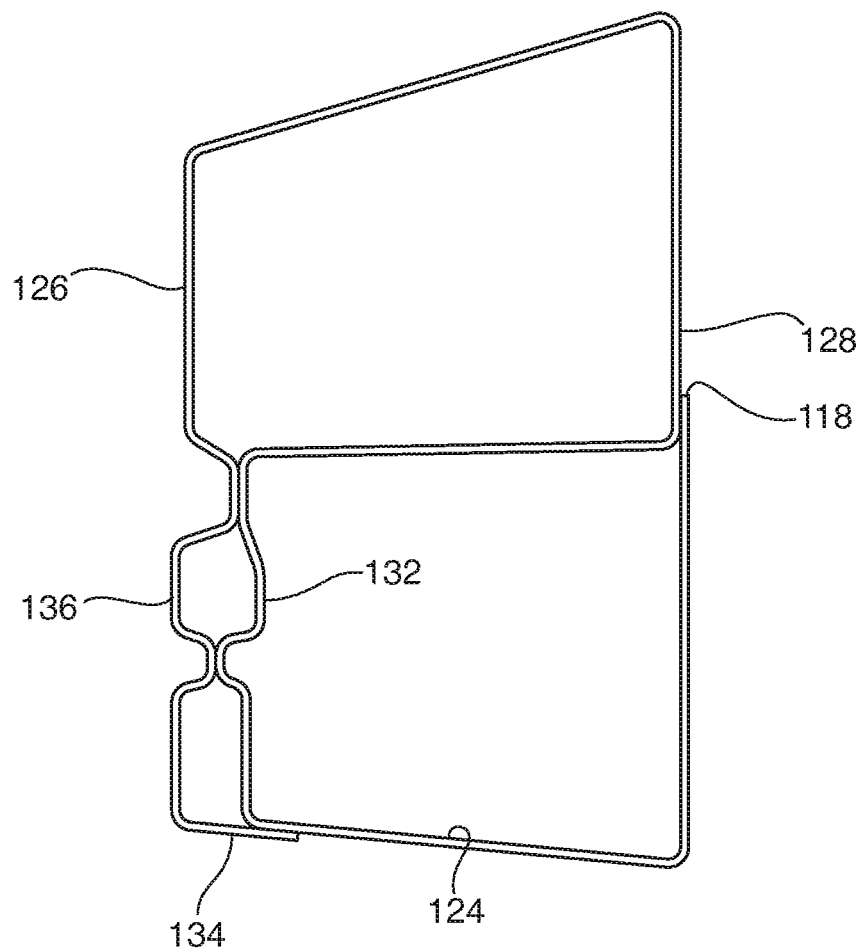
FIG. 10 is an end view of the beam of FIG. 9.

An alternative embodiment is shown in FIGS. 9 and 10 where like reference numerals will be used for like components with a prefix '1' for clarity. In the embodiment of FIGS. 9 and 10, the beam 112 is formed with a reinforcement 132 juxtaposed with the lower portion 136 of the outer wall 126. In the embodiment of FIGS. 9 and 10 however, the flange 134 is formed on the distal edge of the lower portion 136 and overlies the bottom wall 124 on the exterior of the body. The flange 134 is welded to the bottom wall 124 in a manner similar to the welding of the free edge 118 to the inner wall 128. The stages of rolling of the beam 112 from a web 116 would of course be modified to suit the amended configuration.

Figure 11:
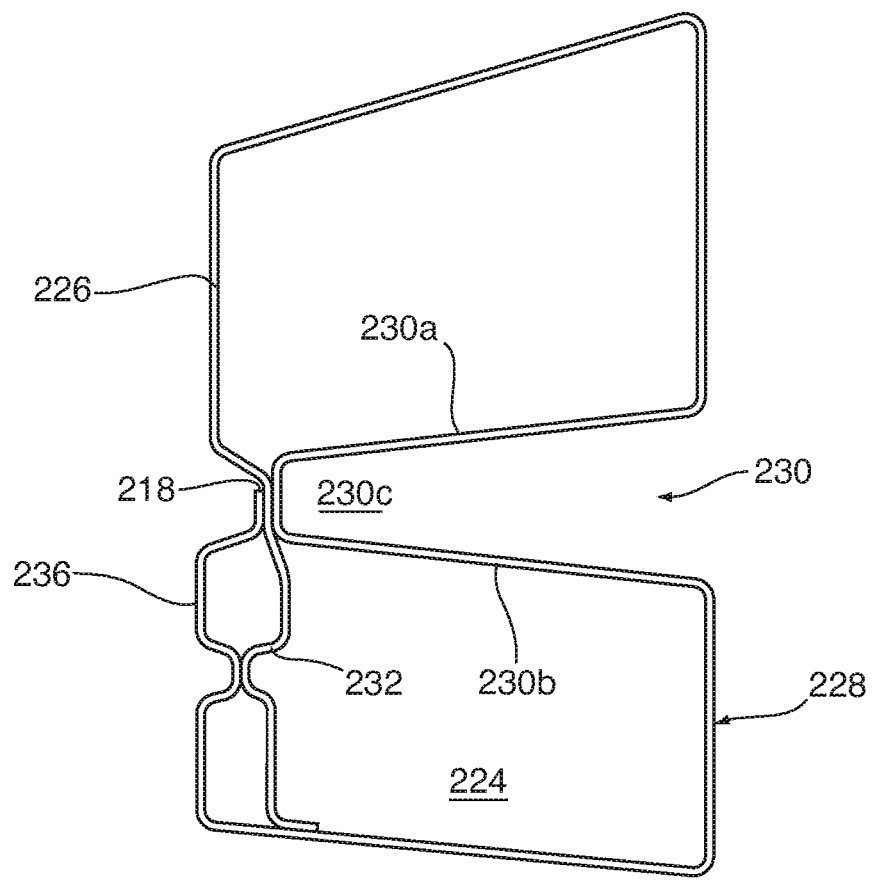
FIG. 11 is an end view of a further embodiment of a beam.

A further embodiment is shown in FIG. 11 where like components will be identified with like reference numerals with a prefix '2' added for clarity. In the embodiment of FIG. 11, the support 230 is provided by a pair of convergent walls 230(a), 230(b) that extend from the inner wall 228. The walls 230(a), 230(b) are interconnected of a bight 230(c) from which the reinforcement 232 extends to the bottom wall 224. In this embodiment, the free edge 218 is positioned to overlie the bight 230(c) and a weld secures the free edge 218, the reinforcement 232 and the bight 230(c). Again it will be observed that the beam 212 is formed from a single web of material and is folded to provide a reinforcement adjacent to and extending along the lower portion 236 of the outer wall 226.

What is claimed is:

1. A beam for a vehicle bumper, said beam comprising an elongate, closed tubular body formed from a continuous web of metal, said body having a first pair of walls spaced from one another and a second pair of walls spaced from one another and extending between said first pair of walls, a support extending between said second pair of walls intermediate first pair of walls and a reinforcement extending between said support and one of said first pair of walls, said reinforcement being located adjacent to but spaced from one of said second pair of walls, whereby a double walled structure is provided over at least a portion of said one of said second pair of walls.

2. The beam according to claim 1 wherein said reinforcement is configured to abut said one of said second pair of walls at a location between said support and said one of said first pair of walls.

3. The beam according to claim 2 wherein at least one of said reinforcement and said portion of said one of said second pair of walls is corrugated to provide a varying spacing there between.

4. The beam of claim 3 wherein each of said reinforcement and said portion of said second pair of walls is corrugated.

5. The beam of claim 1 wherein a lateral edge of said web is folded to define an intersection of said one of said second pair of walls and one of said first pair of walls.

6. The beam of claim 5 wherein said lateral edge is secured to said one of said first pair of walls.

7. The beam of claim 1 wherein a lateral edge of said web terminates adjacent the intersection of said support and the other of said second pair of walls.

8. The beam of claim 7 wherein said lateral edge of said web overlies a median portion of said web and is secured thereto to define said other of said second pair of walls.

9. The beam of claim 3 wherein said reinforcement and said one of second pair of walls are secured to one another at said location at which they abut.

10. The beam of claim 1 wherein said reinforcement and said one of said second pair of walls are secured to one another adjacent said support.

* * * * *